C. Cole,

Sash Balance.

No. 3,229. Reissued Dec. 15, 1868.

Witnesses:

J. M. Connelly

G. W. Reed

Inventor:

Calvin Cole

N. PETERS, PHOTO-LITHOGRAPHER, WASHINGTON, D. C.

United States Patent Office.

CHARLES CLAPP, OF ITHACA, NEW YORK, ASSIGNEE OF CALVIN COLE, OF SAME PLACE.

*Letters Patent No.* 64,492, *dated May* 7, 1867; *reissue No.* 3,229, *dated December* 15, 1868.

IMPROVEMENT IN SASH-STOP.

The Schedule referred to in these Letters Patent and making part of the same.

*To all whom it may concern:*

Be it known that I, CHARLES CLAPP, of Ithaca, Tompkins county, New York, did, by assignment of CALVIN COLE, obtain the whole right and title to Letters Patent, No. 64,492, and dated May 7, 1867, and recorded in liber Y 9, page 13, of Transfers of Patents, and have surrendered the said Letters Patent on account of errors and insufficient claims occurring through accident, or mistake, or inadvertence; and that I do hereby declare that the following is, as I believe, a full and exact description of the invention of the said COLE, reference being had to the accompanying drawings, and to the letters thereon.

Figure 3:
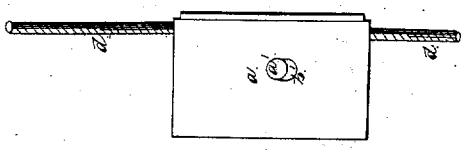
Figure 2:
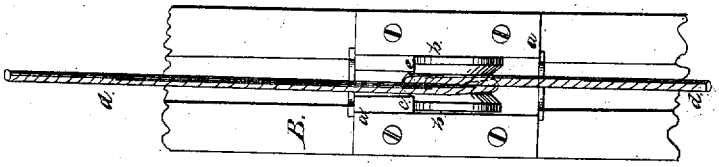
Figure 1:
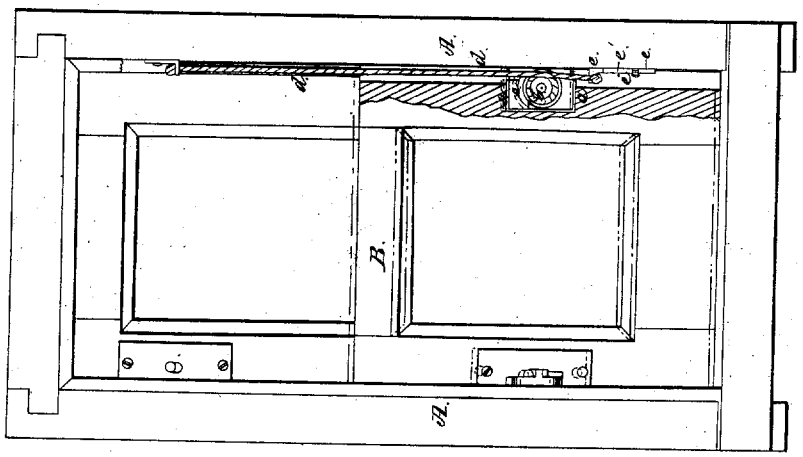
Figure 4:
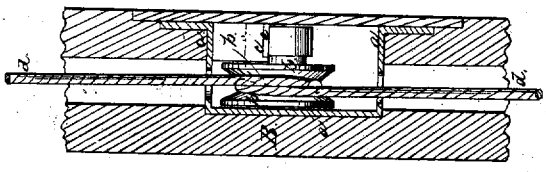

Figure 1 is a front view of a window, with a part of the lower sash removed, with the sash-stop in it;

Figure 2, a face view of the sash-stop, taken at right angles to fig. 1;

Figure 3, a detached side view;

Figure 4, a view of a modification of the stop.

The object is to sustain or stop the window-sash at any point or place, as it slides in its frame, by means of a cord fast to the frame, and having tension and friction on it by certain devices which are inserted into the sash.

For this purpose, there is attached, near the top and bottom of the window-frame, fast at one end, and variable by a tension-plate at the other end, a cord, the middle portion of which passes about one or more friction-wheels, which are either movable in a slot about their journals, or fast in simple bearings; and by the friction thus made on the wheels or cord, one or both, by winding the cord about the wheel or wheels, or among the wheels, aided or not, at pleasure, by a surface of wood or leather, connected with the friction caused by varying the tension of the cord, the friction on the cord is so controlled that the window-sash slides easily in the frame, but is automatically stopped at any desired point.

In fig. 1, A is the window-frame, and B, the lower sash; and in the edges near the centre are seen the metallic cases *a*, in which is the friction-wheel or wheels *b*, the ends of the pivot or pivots being in vertical slots, *b'*, in the cases *a*, so that the wheel or wheels have a vertical motion, when desirable.

The wheels are grooved for the cord, which goes once or more times, or, when preferable, only partially about the wheel or wheels.

The bearing-surface *c* bears on the wheel or wheels *b*, or on the cord *d*, one or both. The cord is fast at the upper plate and adjustable by the lower plate *e*.

When the slot is used, the weight of the sash makes friction on the surface *c*. When no slot is used, the surface *c* and wheels make the friction necessary to hold the sash by the cord.

In figs. 2 and 3, the same letters show the same parts, while in fig. 4, a cylinder on the shaft of the wheel receives the friction of the surface *c*.

As the friction is in proportion to the tension on the cord, one of the metallic plates, *e*, has several slots in it, or other arrangement, as screw-holes, *e**, by which the cord is tightened or loosened.

The advantages and uses of this invention are apparent to those skilled in the art to which it appertains.

*Claims.*

1. The combination of the friction-wheel *b*, having a limited sliding movement, with the friction-bearing or surface *c* and the sustaining-cord *d* and tension-plate *e*, substantially as herein described, for the purpose specified.

2. The combination of the friction-wheel *b*, sustaining-cord *d*, and tension-plate *e*, substantially as set forth.

3. The combination and arrangement of the case *a*, containing the friction-surface *c* and wheel *b*, and the cord *d*, fast at one of its ends to the window-frame, and the plate *e*, with the device for varying its tension at the other, as shown and described.

CHARLES CLAPP.

Witnesses:

SAMUEL J. PARKER,

T. J. MCELHENY.